Jan. 29, 1929.  
C. T. DRAPER  
1,700,697  
MEANS FOR COATING CYLINDRICAL ARTICLES  
Filed Oct. 12, 1925  
5 Sheets-Sheet 2

INVENTOR:  
CHARLES T. DRAPER  
ATTORNEY

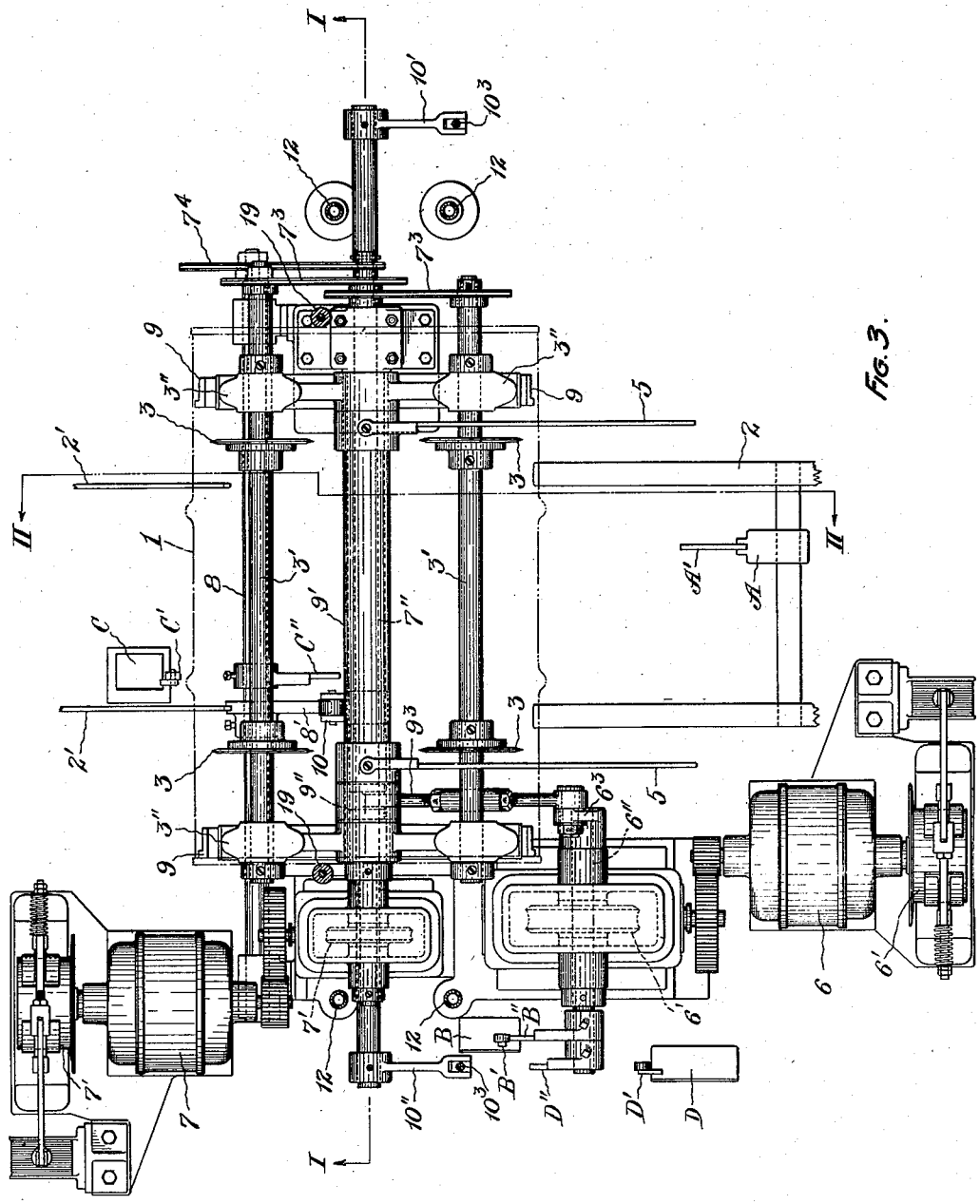
Fig. 3.
INVENTOR:
CHARLES T. DRAPER
By
ATTORNEY.

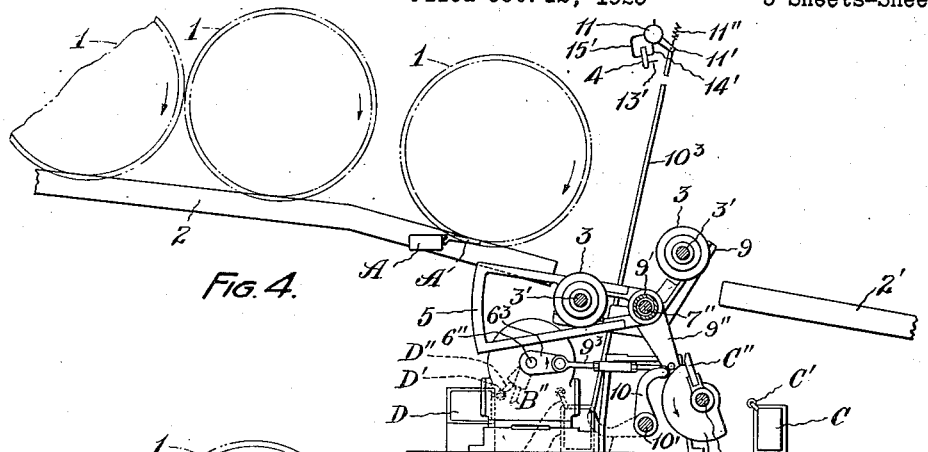

Patented Jan. 29, 1929.

1,700,697

UNITED STATES PATENT OFFICE.

CHARLES T. DRAPER, OF CLEVELAND, OHIO, ASSIGNOR TO THE DRAPER MANUFACTURING COMPANY, OF CLEVELAND, OHIO, A CORPORATION OF OHIO.

MEANS FOR COATING CYLINDRICAL ARTICLES.

Application filed October 12, 1925. Serial No. 61,956.

My invention relates to improvements in means for coating cylindrical articles, and it is particularly adapted and explained as applied to the painting of sheet steel barrels, as at present embodied.

The object of my invention is to develop improved means and procedure for applying an exterior protective coating or coatings automatically, quickly and cheaply to containers and the like.

In the manufacture of sheet metal barrels it has been found necessary to resort to manual labor, attended with considerable expense and variable product, in order to apply one or more coats of paint for protective purposes.

Accordingly, it has been my endeavor to produce means for automatically painting sheet metal barrels attended with marked economies and uniformity of product, without delaying the fabrication of the containers as they come from the finishing machines.

Thus the automatic painting mechanism, comprising means for receiving the barrels successively, for presenting them to the painting mechanism or spray guns, and for advancing the coated barrels to be dried, is brought into the line of a skidway or conveyor along which the fabricated barrels are advanced substantially at the rate of production.

The instant embodiment of my invention comprises means actuated by the entering barrel for starting the mechanism to receive the barrel in a suitable support and check any oncoming barrel or barrels in association with means also automatically operated for painting the sides and ends of the barrel while being rotated by its support, and further means for effecting the discharge of the painted barrel and the return of the support to its initial or receiving position in a complete cycle of operations.

Further details of the preferred embodiment and procedure of my present improvements may be explained in connection with the accompanying drawings, wherein Figure 1 is an intermediate transverse vertical section of my improved mechanism on line I—I, Fig. 3.

Fig. 3 is a horizontal section thereof on line III—III, Fig. 1.

Figs. 4, 5 and 6 are schematic views of the essentials of my improved mechanism and its associated skidway for conveying the barrels, illustrating the successive critical positions of said mechanism, and of the barrels, for explaining a complete cycle of the operation.

Fig. 4, accordingly, is a somewhat diagrammatic view, illustrating the entry of a barrel with the elements of the mechanism in their receiving position.

Fig. 5 is a similar view, illustrating the elements of the mechanism during the painting of a barrel.

Fig. 6 is a similar view, illustrating the elements of the mechanism at the moment of discharging the painted barrel.

Figure 8:
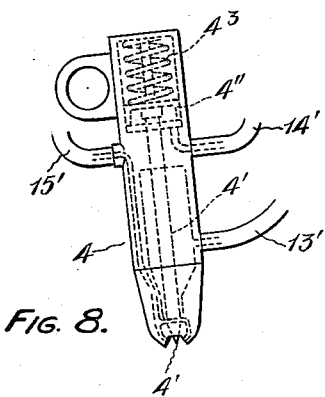
Figure 7:
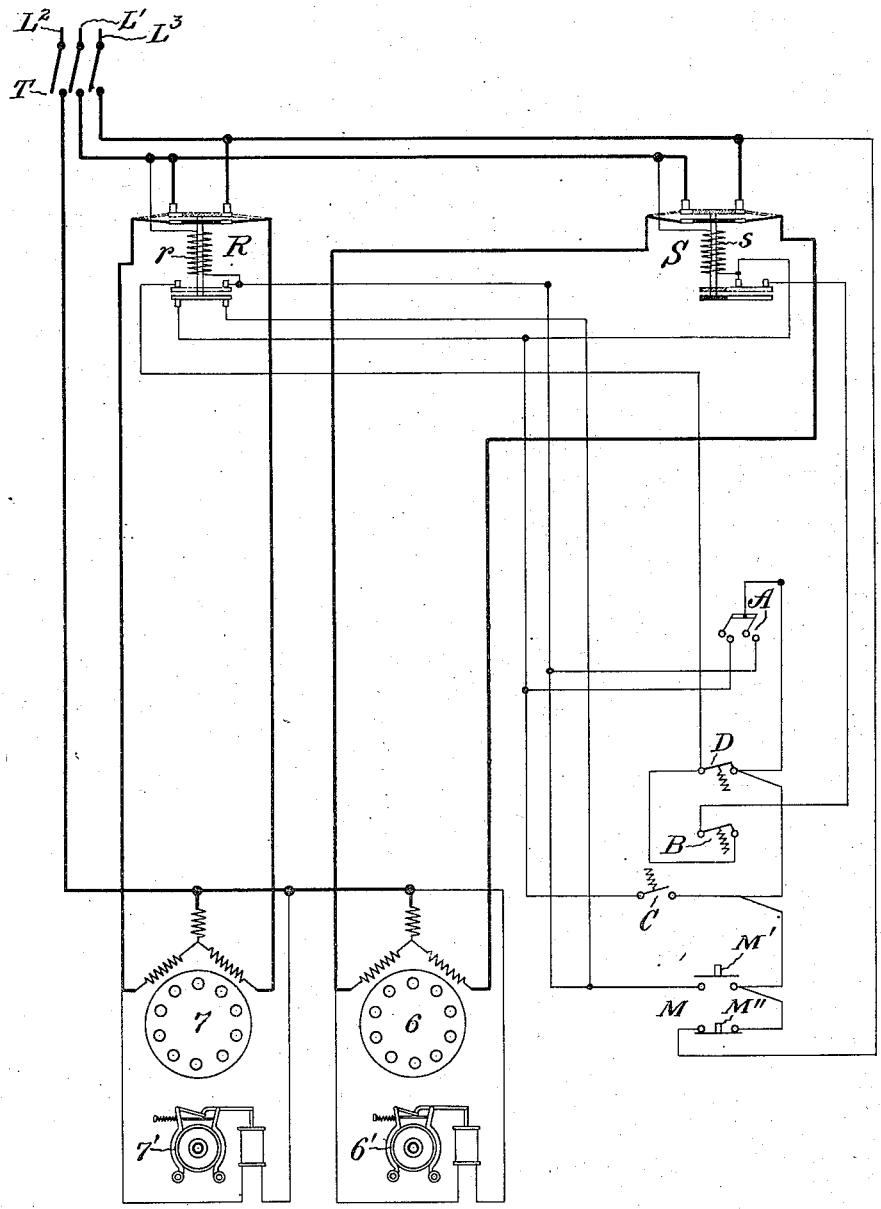

Fig. 7 is a wiring diagram conventionally showing a portion of the control mechanism both in full and dotted line positions; it being understood that the lighter lines represent the control circuits and the heavy lines represent the main power conductors, the circuits of which are independent of the other, except as shown, and Fig. 8 is an enlarged diagrammatic view of a spray nozzle.

Throughout the several figures of the drawings I have employed the same character of reference to indicate similar parts.

It will be helpful to refer first to the diagrammatic drawings briefly before explaining the details of the procedure and mechanism of my invention. Thus, in Fig. 4 the barrels 1 are shown at the left upon a skidway 2 of which the right-hand barrel has depressed the lever A' of a switch A immediately prior to the reception of the barrel by the rollers 3 of its rotating cradle mechanism. In Fig. 5, it will be observed that the right-hand barrel 1 has been rocked to an intermediate position beneath the spray gun 4, while an arcuate stop member 5 has been interposed between the first and second barrels to detain the latter on the skidway out of contact with the switch lever A'. The remaining mechanism has been advanced to the second corresponding or critical position in which the painting takes place as will be fully explained in detail.

The final position of discharging the painted barrel 1 upon the exit skidway 2', is shown in Fig. 6, with the arcuate stop 5 still blocking the next succeeding barrel in its former position out of contact with the starting switch, while the cradle is shown in its final or discharging position with the correlated mechanical elements advanced 180° from the respective positions shown in Fig. 4, to which they are about to be automatically restored for receiving the second barrel. This graphically indicates and briefly describes the complete cycle of the mechanism and procedure which I shall now set forth at length.

Figure 1:
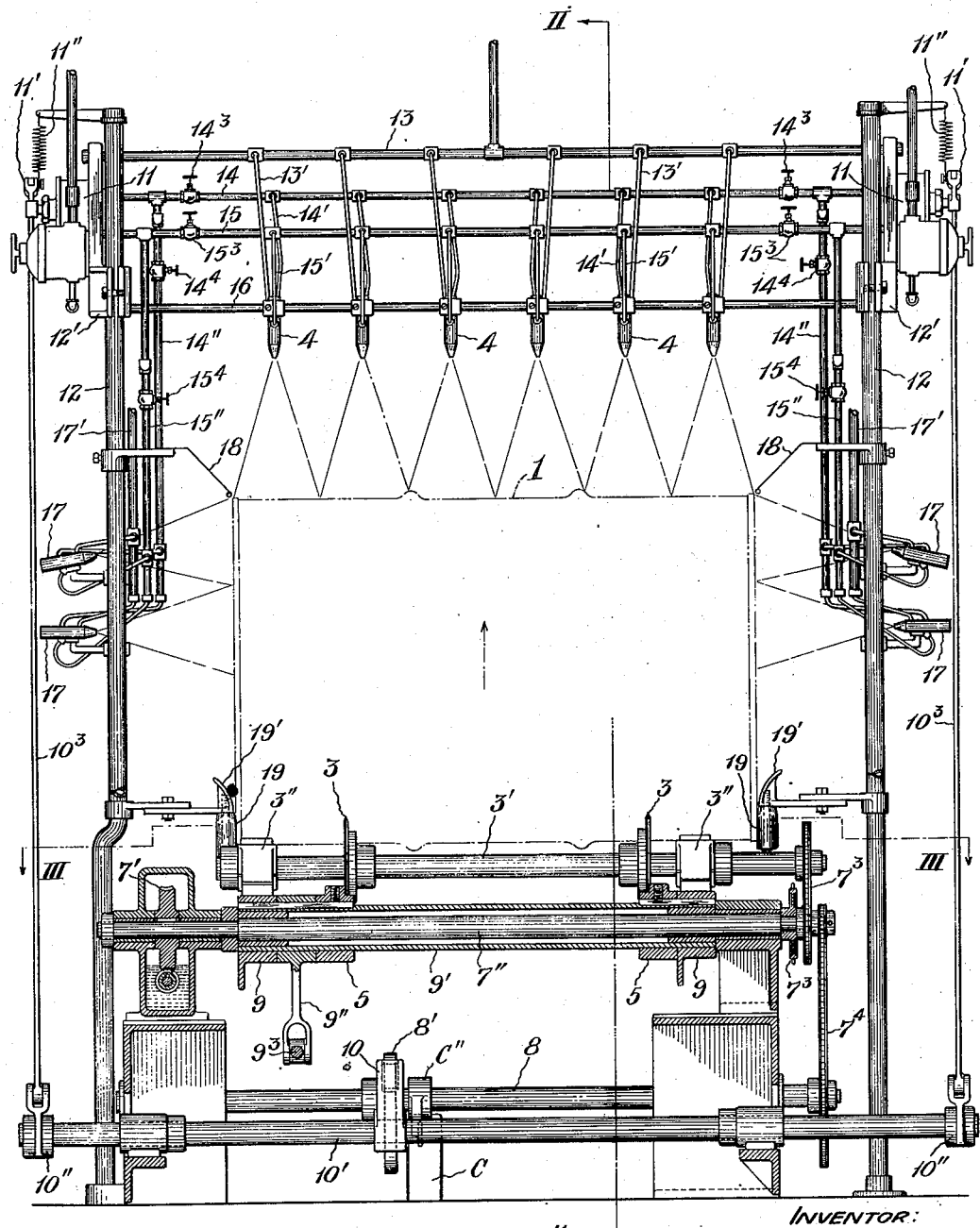

In the specific embodiment herein shown and for which the instant wiring diagram has been developed, there are provided two interrelated sources of power, found in the electric motor 6 which serves to rock the receiving cradle, and the electric motor 7, which is provided for rotating the knife-edge rollers 3 of the cradle and controlling cam shaft 8. Thus, the motor 7 is provided with a reducing worm gear 7', Fig. 1, which is adapted to drive the shaft 7'' and the connecting sprocket chains $7^3$ and $7^4$ at the right of the machine for respectively rotating the knife-edge discs 3 and said cam shaft 8. The discs 3 are longitudinally adjustable along their shafts 3' which are mounted in end bearings 3'' upon the bell-crank cradle frame 9; this in turn being adapted for oscillation by reason of its rotatable mounting upon the hollow shaft 9' having a rocking lever 9'' connected for actuation as hereafter explained.

The motor 6 is connected through a worm reducing gear 6' (shown in dotted lines, Fig. 3), the driven shaft 6'' of which is provided with a crank arm $6^3$ having a connecting rod $9^3$ terminally pivoted from the rocking lever 9'', the two arcuate stops 5 likewise are secured for oscillation with the cradle upon the hollow shaft 9', so that they will at all times stand within the path of, and prevent the advance of barrels 1 along the skidway 2, except in the initial or receiving position of the cradle.

The cam 8' engages the roller terminal of actuating lever 10 mounted upon the shaft 10' and having terminal levers 10'' at its outer ends with which the connecting rods $10^3$ are operatively connected; their upper ends being pivoted to oscillate the levers 11' of the air valves 11 adjustably positioned adjacent to the uprights 12 by means of the lateral clamping frames 12'.

Between said frames there is mounted a transverse connecting pipe 13 connected with the main paint line, two air lines 14 and 15 terminally connected with the air valves 11, and a pipe or rod 16 which mounts a half dozen spray guns 4.

Referring to Fig. 8, somewhat diagrammatically showing upon an enlarged scale one of said spray guns, it is seen that the needle valve 4' is controlled by a piston 4'' adapted to be raised by air pressure against the tension of spring $4^3$. A flexible connecting pipe 13' leads from the paint line to the lower portion of the nozzle. A second flexible pipe 14' leads from the air line 14 to actuate the piston 4'' and a third flexible pipe 15' leads from the air line 15 to the tip of the nozzle, whereby the paint may be sprayed from line 13 and its connection 13' whenever the needle valve is opened.

It will be understood that the air lines are connected with sources of air under pressure approximating forty pounds to the square inch, and the paint line is connected to a supply of paint or suitable coating solution also under pressure as is well known in the art, and forming no part of the present invention.

Similarly, duplicated sets of spray guns 17 are positioned at the sides of the frame connected by separate paint lines 17' with an independent source of supply (not shown), while vertical pipes 14'', 15'', respectively, connect the spray gun with the air lines 14, 15, so that the same may be operated, if desired, in common with the horizontally positioned spray guns 4. Thus, it is possible to apply a paint or other coating material to the barrel or cylindrical article when rotated upon the cradle simultaneously to its ends and to its cylindrical periphery, but of varied character and color, if desired.

To this end, lateral shields 18 are adjustably positioned upon the uprights 12 for the purpose of limiting the areas to be coated by the adjacent spray guns 4 and 17. Valves $14^3$, $14^4$ and $15^3$, $15^4$, respectively, are provided for independently controlling the horizontal and vertical air lines to said spray guns.

In order to insure the proper positioning of the barrel or other cylindrical article when the same shall be advanced to the oscillating cradle, lateral guide rollers 19 also adjustably secured to the uprights 12, are provided to engage the lowermost portion of the barrel beneath the flaring flanged members 19' which serve accurately to position the barrel with respect to the spray guns and the shields as adjusted for any given size of barrel, container or other cylindrical article.

The sequence of operations briefly outlined in connection with the introductory description of my improvement explained in connection with Figs. 4, 5 and 6, will now be understood; it being explained that through the medium of the several starting and stopping electrical switches, A, B, C and D, these operations are timed and correlated to accomplish the automatic painting or coating of the barrels or other cylindrical articles continuously supplied to the skidway 2. It will be observed that the barrels or other articles are supported by non-marking disks 3 which peripherally engage them in fully exposed relation with respect to the spraying apparatus, rendered operative by the action of the rotating means. Moreover, the articles are carried upon an axially pivoted cradle which rocks toward the skidway to receive the barrel and toward the discharge line, after the coating operation, to eject the rotating barrel with an impetus for carrying it forward.

Although I have shown and described the operation of my improved mechanism by means of two electric motors, it should be explained and definitely understood that my invention is by no means limited to the use of separate motor devices for this purpose, nor, indeed, to the particular mode of applying power, since any suitable timing mechanism may be substituted for the actuation of the structural improvements herein set forth and claimed.

As exemplifying the preferred or readily adaptable electro-mechanical means for operating my improved coating mechanism, I may now have reference to the diagram, Fig. 7, setting forth the electrical circuits and relation of inter-connected members hereinbefore described.

I shall now briefly set forth the electrical control apparatus and circuits for effecting the performance in proper sequence of the different operations of this mechanism.

The starting switch A, provided with starting lever A', is mounted on the skidway at the entering position of the barrel 1.

Figure 2:
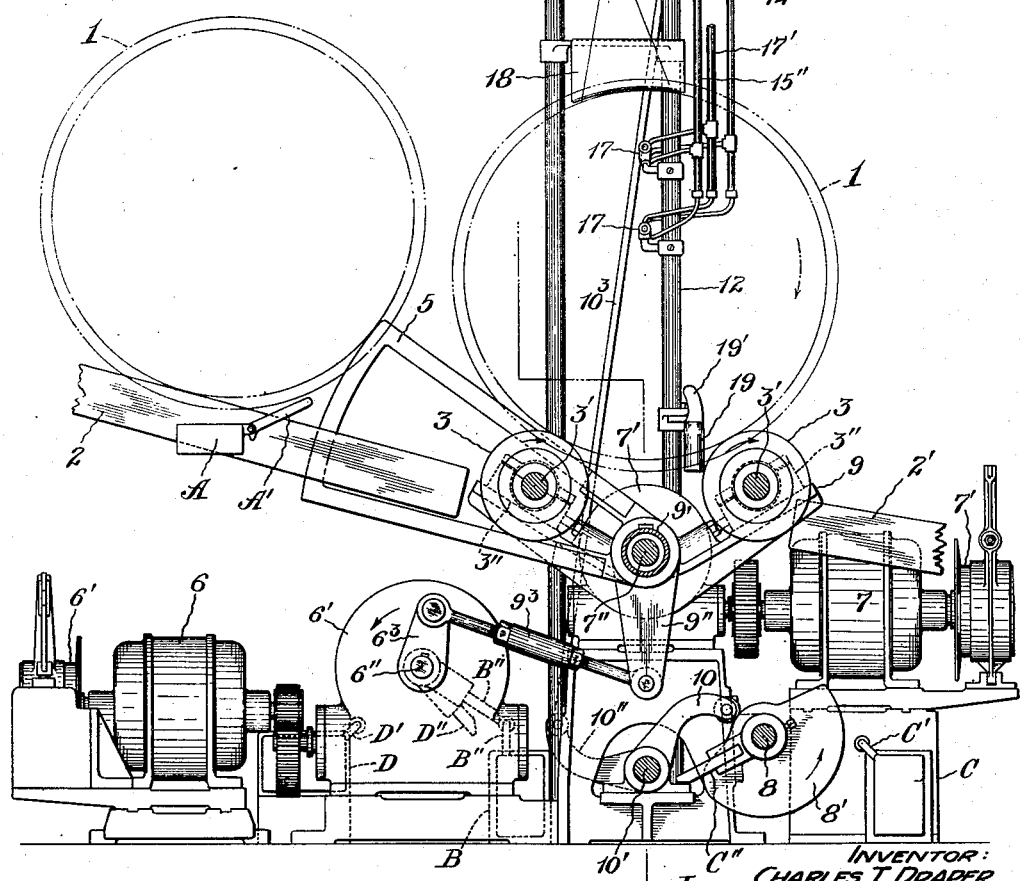
Fig. 2 is a longitudinal vertical section thereof, partially broken away terminally, on line II—II, Fig. 1.

Stopping switch B, provided with roller lever B', is located so as to be engaged by finger B'' as clearly shown in Figs. 2 and 3.

Starting switch C, provided with roller lever C', is located so as to be actuated by finger C''.

Stopping switch D, provided with roller lever D', is adapted to be actuated by finger D''.

Referring now to Fig. 7, the power leads are indicated at switch T, having the conductors L', L², and L³, adapted for connection with the power circuits shown in heavy lines upon the diagram. The main switch for the rocking motor 6 is indicated by S, and the main switch for the rotating motor 7 is indicated by R. It will be understood that each of the motors is provided with a magnetic brake 6', 7', of ordinary construction, adapted to stop the motor quickly as soon as the respective operating circuit is broken for said motor, as is clearly indicated in diagram.

The operation of the electrical control apparatus and circuits in a complete cycle of operation, consists as follows:

The entering barrel closes switch A, thus energizing the solenoids $s$ and $r$ of switch S and switch R, respectively, and starting both the rocking motor 6 and rotating motor 7. It will be understood that the closing of the switches S and R also closes two circuits which insure the current being maintained on the two solenoids $s$ and $r$, and hence, it is not necessary to maintain switch A in closed relation in order to continue the energization of these solenoids. Both motors accordingly continue their rotation until finger B'' engages roller lever B' of switch B, thus deenergizing solenoid $s$ of switch S, which in turn stops the rocking motor 6. Meantime, the rotating motor continues to actuate the knife-edged supports 3 and cam shaft 8.

The previously described rotation of the rocking motor will have effected the movement of the cradle from the starting position shown in Fig. 4 to the vertical or operative position shown in Fig. 5, when the painting or coating of the barrel is accomplished.

Concurrently with the stopping of the rocking motor, the cam 8' moves the lever 10 which opens the spray guns as previously described. This spraying of the barrel continues until it has been completely coated over its entire surface, rotating approximately 370°, whereupon the cam 8' permits the lever 10 to move back to its original position and likewise permits the spring 11'' to close the air valve.

Immediately thereafter finger C'' engages roller lever C' of starting switch C. The closing of this switch C again energizes solenoid $s$, thus restarting the rocking motor 6. The starting of this motor causes the cradle to tilt to the discharging position at which time the barrel rolls out on to the skidway. The motor does not stop at this position, however, but continues to rotate until the cradle has reached the receiving position, at which time the finger D'' strikes the roller lever D' of switch D. This causes the switch D to open, which in turn deenergizes both the solenoids $s$ and $r$. This automatically stops both rocking motor 6 and rotating motor 7, and this condition obtains until switch A is again closed by the advance of an unpainted incoming barrel.

By referring to the diagram, it will be noted that a manual control switch M is also provided with a starting button M' and a stopping button M''. This manually controlled switch is adapted to start and stop the mechanism whenever desired by the operator, but obviously has nothing to do with the continued automatic operation of the same, so long as the barrels or other cylindrical articles are supplied to the skidway.

From the foregoing it will be seen that the procedure attainable by employing the specific mechanism set forth, or its mechanical equivalent, permits of the simultaneous painting or coating of the periphery and ends of a cylindrical article without marking or marring the coated surface, or alternatively, the periphery or an end or ends only of said article may be coated, and with different materials or colors. This result automatically is effected as long as the articles are supplied to the skidway and contact, one by one, with the initial starting switch, so that the cycle repeats itself for continuing the operations for which the mechanism is designed and adjusted.

Having now described the preferred embodiment of my invention and the procedure attainable by apparatus of this type for suitably coating cylindrical articles, I claim as new and desire to secure by Letters Patent, the following:

1. In mechanism of the class described, the combination with a receiving cradle, of means for tilting the cradle from its operative to its discharging position, means associated with said cradle for peripherally supporting and rotating cylindrical articles individually, spraying apparatus, and automatic means for rendering the spraying apparatus operative concurrently with the rotation of the cylindrical article, substantially as set forth.

2. In mechanism of the class described, the combination with a tilting cradle, of means for actuating the cradle in succession from a receiving position to an operative position and a final discharge position, further means associated with said cradle for peripherally supporting and rotating cylindrical articles individually, spraying apparatus, and automatic means for rendering the spraying apparatus operative concurrently with the rotation of the cylindrical article while in its operative position upon the cradle, substantially as set forth.

3. In mechanism of the class described, the combination with a receiving chute and its detent for the cylindrical articles to be coated, of a tilting cradle, means for automatically supplying the articles individually to the cradle, means for actuating said cradle in succession from a receiving position to an operative position, a final discharge position and its return, further means associated with said cradle for peripherally supporting and rotating the cylindrical articles individually, coating apparatus, and automatic means for rendering the latter operative concurrently with the rotation of the cylindrical article while in its operative position upon the cradle, substantially as set forth.

4. In mechanism of the class described, the combination with a receiving cradle, of means for tilting it from its operative to a discharging position, a plurality of circular knife-edged supports provided on said cradle, means for rotating the same, coating apparatus associated with the cradle, and means controlling the concurrent rotation of said supports and the operation of the coating apparatus, substantially as set forth.

5. In mechanism of the class described, the combination with a receiving cradle, of means for tilting it from side to side and for retaining it in operative position temporarily, coating apparatus associated therewith, and timed controlling means associated with said members adapted to insure the tilting of the cradle successively from one position to another and render the coating apparatus operative during the intermediate positioning of the cradle in its operative position, substantially as set forth.

6. In mechanism of the class described, the combination with a receiving frame, of means for rotatably supporting cylindrical articles thereon, coating apparatus associated with the end and peripheral positions of the supported article, an interposed shielding means adapted to individualize the end and peripheral coating operations, and means for rendering the coating apparatus operative during the rotation of the cylindrical article upon the receiving frame, substantially as set forth.

7. In mechanism of the class described, the combination with parallel shafts and means for rotating them concurrently, of pairs of knife-edged disks adjustably mounted upon said shafts in opposing relation and adapted to be rotated in unison, a spraying apparatus associated in peripheral position with respect to a cylindrical article when supported rotatably upon the knife-edges, and automatic means for rendering the spraying apparatus operative concurrently with the rotation of the supporting disks, substantially as set forth.

8. In mechanism of the class described, the combination with a supporting and actuating shaft, of means for rotating the shaft, a plurality of knife-edged disks rotatably mounted in opposing relation to receive and support a cylindrical article rotatably, spraying apparatus associated with the peripheral position of such article, and automatic means for rendering the spraying apparatus operative concurrently with the rotation of the article upon the knife-edged disks, substantially as set forth.

9. In mechanism of the class described, the combination with an axially tilting cradle, of paired parallel shafts provided thereon, means for rotating one of said shafts, a plurality of knife-edged disks adjustably mounted in opposing relation upon said shafts adapted to receive and rotatably support a cylindrical article in operative position upon the cradle, spraying apparatus associated with the supporting position of the cradle, and automatic means for effecting the operation of the spraying apparatus concurrently with the rotation of the supporting disks, substantially as set forth.

In testimony whereof I do now affix my signature.

CHARLES T. DRAPER.